May 31, 1960     E. J. BERNABEI     2,938,287
ROTARY SLIDE HOLDER FOR PROJECTORS

Filed Feb. 7, 1958     2 Sheets-Sheet 1

INVENTOR.
ELMER J. BERNABEI,
BY
ATTORNEY.

May 31, 1960  E. J. BERNABEI  2,938,287
ROTARY SLIDE HOLDER FOR PROJECTORS
Filed Feb. 7, 1958  2 Sheets-Sheet 2
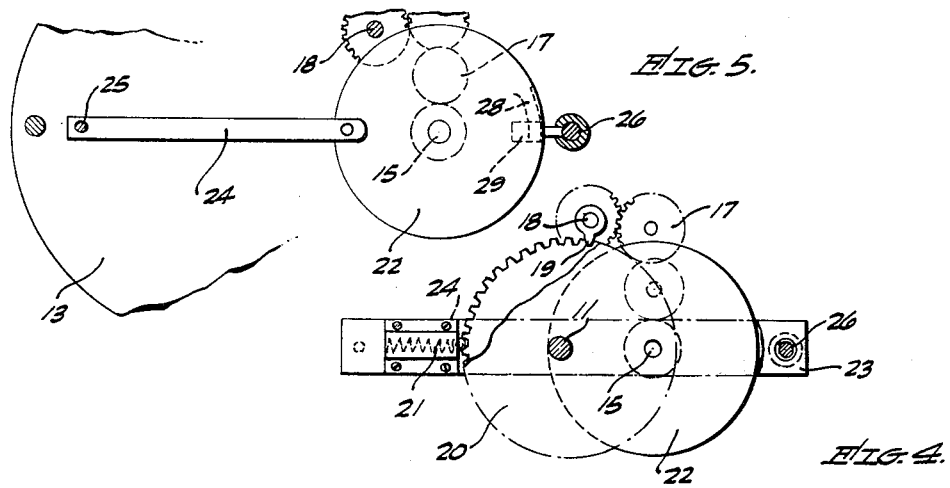
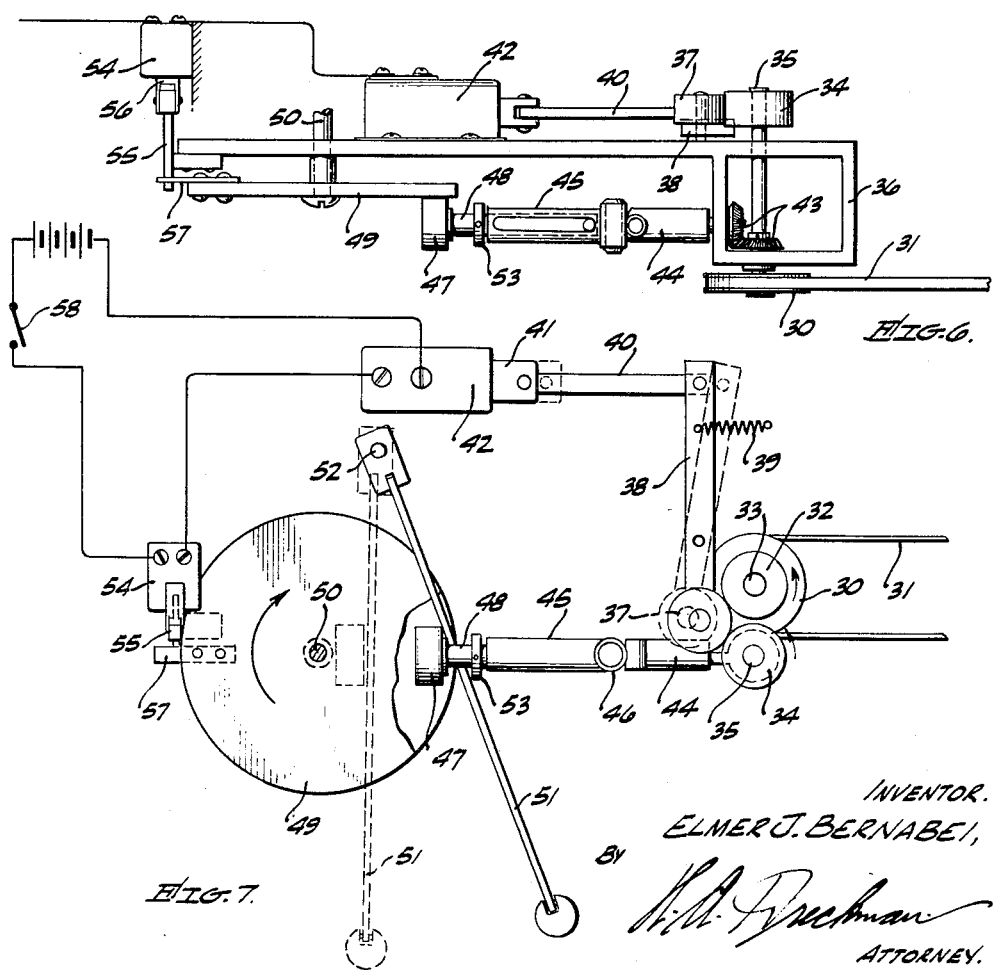
INVENTOR.
ELMER J. BERNABEI,
ATTORNEY.

United States Patent Office 2,938,287
Patented May 31, 1960

2,938,287

ROTARY SLIDE HOLDER FOR PROJECTORS

Elmer J. Bernabei, 2971 W. 8th St., Los Angeles, Calif.

Filed Feb. 7, 1958, Ser. No. 713,951

3 Claims. (Cl. 40—36)

This invention relates to a rotary slide holder for projectors, and particularly to a means of moving the slides or transparencies out of and into the cylindrical magazine so that the various slides in the magazine may be viewed on a screen.

An object of my invention is to provide a novel rotary slide holder with a motor driven means of successively moving the various slides out of the holder or magazine, and subsequently returning the slides into the magazine after they have been viewed.

Another object of my invention is to provide a novel rotary slide holder with a motor driven means which will continuously and successively move the various slides out of and into the cylindrical drum; the time of viewing the various slides or transparencies being controlled by the motor, the speed of which might be controlled or it could be turned off and on.

Another object is to provide a novel rotary slide holder of the character stated in which the drive to the slide moving mechanism may be controlled by a manually actuated solenoid or the like which operates a clutch means or a disconnectable drive.

Other objects, advantages and features of invention may appear from the accompanying drawing, the subjoined detailed description and the appended claims.

In the drawing:

Figure 4 is a sectional view taken on line 4—4 of Fig. 2.

Figure 5 is a sectional view taken on line 5—5 of Fig. 2.

Figure 6 is a side elevation of a modified form of drive to the slide holder.

Figure 7 is a plan view of the same.

Figure 1:
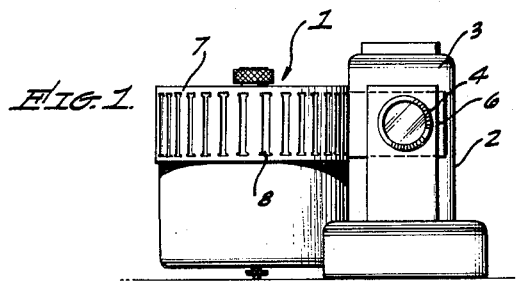
Figure 1 is a front elevation of my rotary slide holder mounted on a projector.
Figure 3:
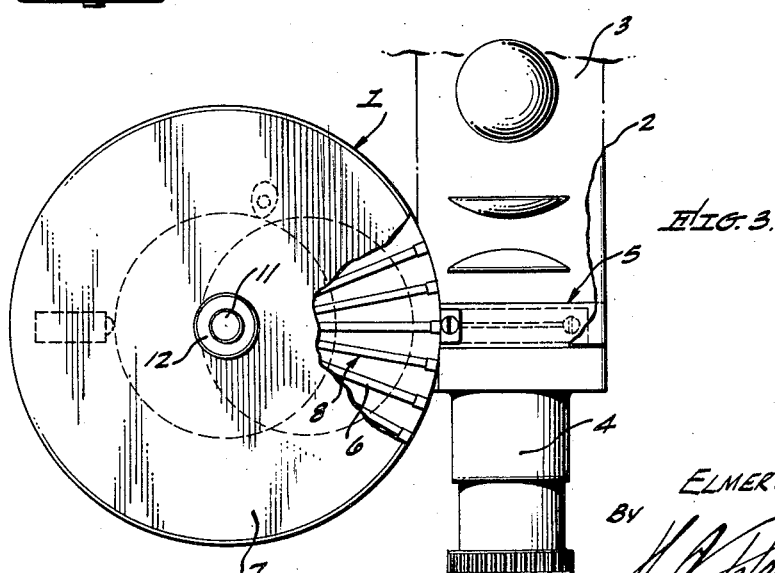
Figure 3 is a fragmentary plan view of the slide holder mounted on the projector.

Referring more particularly to the drawing, my rotary slide holder 1 is mounted on a projector 2, which includes the light inclosing structure 3 and the telescope or lens tube 4, all of which is usual and well known in the art. An opening or slot 5 in the telescope 4 is shaped to receive the rectangular slides or transparencies 6. The rotary slide holder 1 includes a cylindrically shaped drum 7 which is provided with a plurality of radial slots or compartments 8, in each of which one of the slides 6 is positioned. The drum 7 is positioned adjacent to the opening or slot 5 in the telescope 4, substantially as shown in Figs. 1 and 3. When each of the slots 8 is positioned opposite the opening 5 the slide or transparency 6 therein can be moved radially and outwardly from its position within the drum 7 to a position within the telescope 4 where it can be viewed. The transparencies 6 are each mounted in a frame 9 and each of the frames 9 is formed with a notch or recess 10 in the bottom edge thereof, and this recess is positioned adjacent the outer periphery of the drum 7 in one position of the frame 9. The purpose of this recess is to permit the frame 9 to be pushed radially outwardly and retracted into the drum 7 by an automatic mechanism, which will be subsequently described. The drum 7 is fixedly mounted on a central shaft 11 by means of the nut 12 and the drum rotates with this shaft in a step by step manner, as will be subsequently described.

The means to rotate the drum 7 in a step by step manner, and to move the frames 9 with the transparencies 6 therein outwardly to a viewing position within the telescope 4 is as follows: A frame 13 below the drum 7 has an electric motor 14 mounted thereon. This electric motor can be provided with a rheostat or a switch so that the speed of the motor can be controlled if desired, or the motor can be started and stopped as required. The motor 14 drives the shaft 15 through an appropriate belt drive 16. A gear train 17 extends from the shaft 15 to a vertical shaft 18 which is suitably journaled in the frame 13. The shaft 18 is provided with a single tooth or detent 19 on the upper end thereof and this single tooth engages a gear 20 on the shaft 11 once during each revolution of the shaft 18. A spring detent 21 engages the gear 20 for the purpose of holding that gear against rotation, except when the gear is engaged by the tooth 19 to intermittently advance the gear and position the frames 9 to enter the slot 5 in the telescope 4. Thus the drum 7 will be advanced one increment at each full revolution of the shaft 15.

To project the transparencies 6 out of the drum 7 and into the telescope 4, I provide a pusher mechanism consisting of a disc 22 mounted on the shaft 15. A slide bar 23 is slidably mounted on the frame 13 and this slide bar is connected to a link 24 through the pin 25. The link 24 is pivotally attached to the disc 22 adjacent the periphery of the disc so that the pusher bar 23 will be reciprocated when the disc 22 is rotated by the motor 14. A finger 26 is slidably mounted for vertical movement on the outer end of the pusher bar 23. A spring 27 engages the finger 26 to urge this finger upwardly for the purpose of entering the notch 10 and thus enabling the pusher bar 23 to move the frame 9 outwardly from the drum 7 and into the telescope 4. The spring 27 normally holds the finger 26 in engagement with the notch 10 of the frame 9 until the finger is retracted or pushed downwardly by the cam 28 on the bottom of the disc 22, which engages the roller 29 once during each revolution of the disc 22 to thus retract the finger 26 and permit the drum 7 to be partially rotated in a manner previously described. The retraction of the finger 26 and the rotation of the drum 7 are properly timed so that the finger will be depressed during the interval that the drum 7 is rotated.

In the method of intermittently rotating the drum 7 and then sliding the pictures or transparencies 6 out of the drum and into the telescope 4 of the viewer, I have disclosed an electric motor which drives through appropriate gearing to accomplish these results. The speed with which the various transparencies are viewed can be determined by the speed of the motor 14 through an appropriate rheostat (not shown) which is usual and well known in the art, or through a manually actuated switch to turn the motor off and on as required. In the structure shown in Figs. 6 and 7 I have shown a modified control of the drive mechanism to the disc 22, and also to the intermittent rotating mechanism of the drum 7, which is the gear 20 and the detent 19. This control mechanism consists of a pulley 30 which is continuously rotated by the belt 31 which extends from an electric motor, such as the motor 14. A friction pulley 32 is mounted on the common shaft 33 with the pulley 30. A driven pulley 34 is spaced from the pulley 32 and is mounted on the shaft 35 which is journaled in the frame 36, which may be part of the frame 13 previously described. A drive pulley 37 is journaled on a control arm 38, which arm is pivotally mounted on the frame 36. A spring 39 normally urges the arm 38 to a position to move the driving pulley 37 out of engagement with the pulleys 32 and 34. A link 40, attached at one end to the arm 38 and at the other end to the armature 41 of the solenoid 42, causes the arm 38 to be swung on its pivot and move the driving pulley into engagement with both of the pulleys 32 and 34, thus driving the shaft 35 and the meshing miter gears 43. In this manner the trunnion 44 is driven, and also the sleeve 45 which is connected to the trunnion 44 through the universal joint 46. A friction pulley 47 is mounted on the shaft 48 which is slidably mounted in the sleeve 45 so that the friction drive pulley 47 can be adjusted in its frictional contact with the driven disc 49. By moving the friction pulley 47 inwardly or outwardly with relation to the center of the disc 49 the speed of that disc will be varied, and also the speed of rotation of the drive shaft 50 which is the same or a continuation of the shaft 15 previously described. The driving disc 47 can be adjusted by the lever 51 which is pivoted at one end as shown at 52 and extends through a yoke 53 on the shaft 48. A second solenoid 54 includes a stop finger 55 on the armature 56 thereof and this stop finger in one position moves into the path of a plate 57 on the disc 49 to hold the disc against rotation until the solenoid 54 is actuated to raise the finger 55 and permit rotation of the disc 49. The solenoids 42 and 45 are simultaneously actuated through the manual switch 58 and activation of these solenoids will release the disc 49 for rotation and simultaneously will cause the driving pulley 37 to engage the pulleys 32—34, thus rotating the shafts 44—48 and driving pulley 42 to thus rotate the shaft 50 and the shaft 15 which, in turn, activate the drum 7 and the mechanism to expel and retract the transparencies 6 in sequence as the drum 7 is rotated in a step by step manner.

*In operation*

Figure 2:
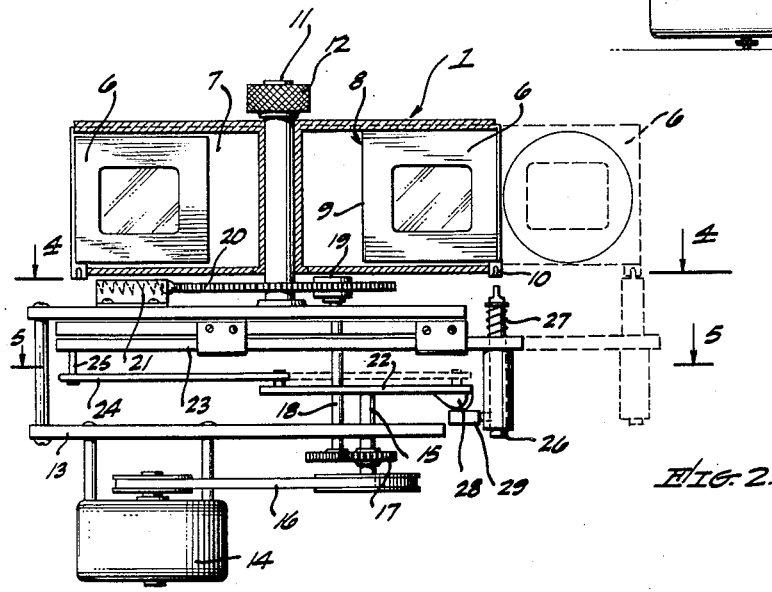
Figure 2 is a vertical sectional view of my slide holder.

Considering first the method of rotating the drum 7 in a step by step manner and subsequently expelling a transparency 6 into the telescope 4 of the viewer 2, the motor 14 is activated to drive the shaft 15 which, in turn, rotates the disc 22. In one position of the disc 22 the cam 28 engages the roller 29 to depress the finger 26 and thus disengage that finger from the notch 10 in one of the transparencies 6. While the cam 28 is still depressing the finger 26 the disc 22 rotates through a partial revolution sufficient to cause the detent 19 to engage the gear 20, and partially rotate the drum 7 to a position where a transparency 6 is in alignment with the slot 5. The cam 28 now moves off of the roller 29 and the finger 26 is pressed upwardly by the spring 27 to engage the notch 10 in one of the transparencies 6. The link 24 is now in a position to push the bar 23 on which the finger 26 is mounted. When the bar 23 moves outwardly to the dotted position in Fig. 2 the transparency 6 will be moved into the slot 5 and to a position to be viewed on a screen. The transparency continues to be viewed until the link 24 pushes the bar 23 inwardly, thus moving the transparency 6 out of the telescope 4 and back into the drum 7. At this time the cam 28 again engages the roller 29 to depress the finger 26 and the next step of partially rotating the drum 7 is repeated, as previously described.

A means of manually controlling the time that the transparencies are within the projector is disclosed in Figs. 6 and 7. In this construction the pulley 32 is continuously rotated by an electric motor. The drive from the pulley 32 to the pulley 34 is manually controlled as follows: The driving pulley 37 is moved into and out of contact with the pulleys 32—34 by the manually controlled solenoid 42. When the solenoid 42 is actuated the driving pulley 37 engages the pulleys 32 and 34 thereby driving the shaft 44 and the sleeve 45. This, in turn, drives the shaft 48 and the friction drive pulley 47 to rotate the disc 49. The disc 49 rotating the shaft 50 will, in turn, drive a disc 22 since the shaft 50 is similar to the shaft 15 shown in Figures 2, 4 and 5. The speed of rotation of the shaft 50 can be controlled manually by shifting the driving pulley 47 radially across the disc 49, this being accomplished by moving the lever 51 back and forth as might be required. The disc 49 is permitted one complete revolution since a stop is provided by the solenoid 54 which has a finger 55 in the path of the stop plate 57 on the disc 49; the plate 57 engaging the finger 55 after making one complete revolution and is there stopped until the solenoid 54 is again manually actuated to permit release of the plate 57, and simultaneously actuating the solenoid 42 to engage the drive pulley 37, as previously described.

Having described my invention, I claim:

1. In a picture viewer including an optical picture projector having a slot therein to receive picture slides; a drum adapted to hold a plurality of picture slides, means rotatably mounting said drum adjacent said picture projector, said drum having a plurality of radial slots therein to slidably receive picture slides, a frame, a shaft journaled on said frame, a gear on said shaft, a detent engageable with the gear to intermittently rotate said gear, an electric motor, a gear reduction drive extending from said motor to the detent, a disc rotatably mounted in said frame, said gear reduction drive extending to the disc to rotate the same, means detachably securing said drum to said shaft, a pusher bar, means slidably mounting the pusher bar in the frame, a finger reciprocally mounted on said pusher bar, said finger being engageable with each of the picture slides successively to reciprocate said slides radially out of the drum and into said slot in the optical picture projector, and a link extending from the disc to said pusher bar to reciprocate the pusher bar, a cam on said disc, said cam being engageable with said finger in one position of the disc to disengage the finger from the picture slide.

2. In a picture viewer including an optical picture projector having a slot therein to receive picture slides: a drum adapted to hold a plurality of picture slides, means rotatably mounting said drum adjacent said picture projector, said drum having a plurality of radial slots therein to slidably receive picture slides, a frame, a shaft journaled on said frame, a gear on said shaft, a detent engageable with the gear to intermittently rotate said gear, an electric motor, a detent shaft on which said detent is mounted, gear reduction means extending from said motor to said detent shaft, a second shaft, a disc on the second shaft, said second shaft being also continuously rotated by the gear reduction means, means detachably securing said drum to the first named shaft, a pusher bar reciprocally mounted in said frame, a link extending from said disc to the pusher bar to reciprocate said bar, a finger on said pusher bar slidably mounted therein, said finger detachably engaging each of the picture slides successively to reciprocate said slides radially out of the drum and into said slot in the optical picture projector, and means on the disc engageable with said finger in one position of the disc to depress the finger and disengage the same from the picture slide.

3. In a picture viewer including an optical picture projector having a slot therein to receive picture slides; a drum adapted to hold a plurality of picture slides, means rotatably mounting said drum adjacent said picture projector, said drum having a plurality of radial slots therein to slidably receive picture slides, a frame, a shaft journaled on said frame, a gear on said shaft, a detent engageable with the gear to intermittently rotate said gear, an electric motor, a gear reduction drive extending from said motor to the detent, a disc rotatably mounted in said frame, said gear reduction drive extending to the disc to rotate the same, means detachably securing said drum to said shaft, a pusher bar, means slidably mounting the pusher bar in the frame, a finger reciprocally mounted on said pusher bar, said finger being engageable with each of the picture slides successively to reciprocate said slides radially out of the drum and into said slot in the optical picture projector, and a link extending from the disc to said pusher bar to reciprocate the pusher bar, means on said disc engageable with said finger in one position of the disc to move said finger out of engagement with a picture slide, and spring means bearing against said finger to urge said finger into engagement with a picture slide.

References Cited in the file of this patent

UNITED STATES PATENTS

| | | |
|---|---|---|
| 1,178,461 | Tilley et al. | Apr. 4, 1916 |
| 2,293,408 | Schwanhausser | Aug. 18, 1942 |
| 2,538,712 | Tarpinian | Jan. 16, 1951 |
| 2,711,602 | Wiklund | June 28, 1955 |
| 2,854,888 | Kaye | Oct. 7, 1958 |

FOREIGN PATENTS

| | | |
|---|---|---|
| 427,684 | France | Aug. 10, 1911 |
| 463,687 | France | Mar. 2, 1914 |